United States Patent [19]

Bridigum et al.

[11] 4,404,987

[45] Sep. 20, 1983

[54] CAP NUT FOR A TRIP COCK DEVICE INCLUDING A DETENT ARRANGEMENT FOR OVERRIDING AUTOMATIC RESET

[75] Inventors: Robert J. Bridigum, Plum Township, Allegheny County; William S. Johnston, Forest Hills Borough, both of Pa.

[73] Assignee: American Standard Inc., Wilmerding, Pa.

[21] Appl. No.: 305,236

[22] Filed: Sep. 24, 1981

[51] Int. Cl.³ .................... F16K 37/00; F16K 31/00; F16K 31/524

[52] U.S. Cl. .................................. 137/556; 74/527; 74/531; 246/190; 251/32; 251/74; 251/251; 251/297

[58] Field of Search ............ 251/32, 74, 251, 297; 137/347, 556; 74/527, 531; 246/190; 303/86

[56] References Cited

U.S. PATENT DOCUMENTS

| | | | |
|---|---|---|---|
| 27,801 | 4/1860 | Higginbotham | 251/251 |
| 1,065,659 | 6/1913 | Bohannon | 251/74 |
| 1,143,669 | 6/1915 | Watrous | 251/32 |
| 1,305,738 | 6/1919 | Nevens | 246/190 |
| 2,007,569 | 7/1935 | Hoke | 251/74 |
| 2,121,552 | 6/1938 | Stevens | 246/190 |
| 2,171,178 | 8/1939 | Johnson et al. | 251/74 |
| 3,275,022 | 9/1966 | Kobayashi et al. | 251/74 |
| 3,674,237 | 7/1972 | Heyer et al. | 251/32 |
| 4,293,118 | 10/1981 | Olson et al. | 74/568 R |

FOREIGN PATENT DOCUMENTS 438931  3/1912  France ................. 246/190

OTHER PUBLICATIONS

Westinghouse Air Brake Division, "D-1 Trip Cocks with Shear Bolt," Nov. 1979, pp. 1-9.

Primary Examiner—George L. Walton
Attorney, Agent, or Firm—R. S. Visk

[57] ABSTRACT

A trip cock device including a pilot valve actuable by a trip lever, when the train on which the trip cock is mounted passes over a trip arm secured to the track, for causing a release valve in the trip cock to be opened and opening brake pipe pressure to atmosphere, at an emergency rate, for effecting an emergency brake application. Axial displacement of the pilot valve, along with a stem thereon, causes a groove in the stem to be engaged by a detent member for securing the trip cock in open disposition until the detent is released manually.

3 Claims, 3 Drawing Figures

CAP NUT FOR A TRIP COCK DEVICE INCLUDING A DETENT ARRANGEMENT FOR OVERRIDING AUTOMATIC RESET

BACKGROUND OF THE INVENTION

A trip cock device is usually mounted on a rapid transit car and connected to the brake pipe, so that, when the trip cock is actuated by a trip arm fixed to the track, the brake pipe is vented to atmosphere, via the trip cock, to effect, in a well-known manner, an emergency brake application. The trip arm is usually placed in an area that is prohibited to the train on which the trip cock is mounted. Presently-used trip cocks, once actuated, automatically reset themselves, so that the engineer, who is required to report such incidents each time they occur, may ignore the incident and neglect to report it.

SUMMARY OF THE INVENTION

The object of the present invention is to provide a trip cock device which, when actuated, requires the engineer to perform an act of resetting the device before he can release the brakes and proceed.

Briefly, the invention comprises a modification of the presently-existing trip cock device, which includes a pilot valve stem axially displaced when the trip cock device is actuated. Normally, the valve stem is automatically retracted when the trip cock automatically resets itself. According to the invention, the valve stem, which reciprocates through a bore in a cap nut, is provided with an annular groove which is engageable, when the valve stem is displaced, by either a clip spring or a ball detent disposed in the cap nut for preventing retraction of the valve stem until the clip spring or ball detent is manually released.

DESCRIPTION AND OPERATION

Figure 1:
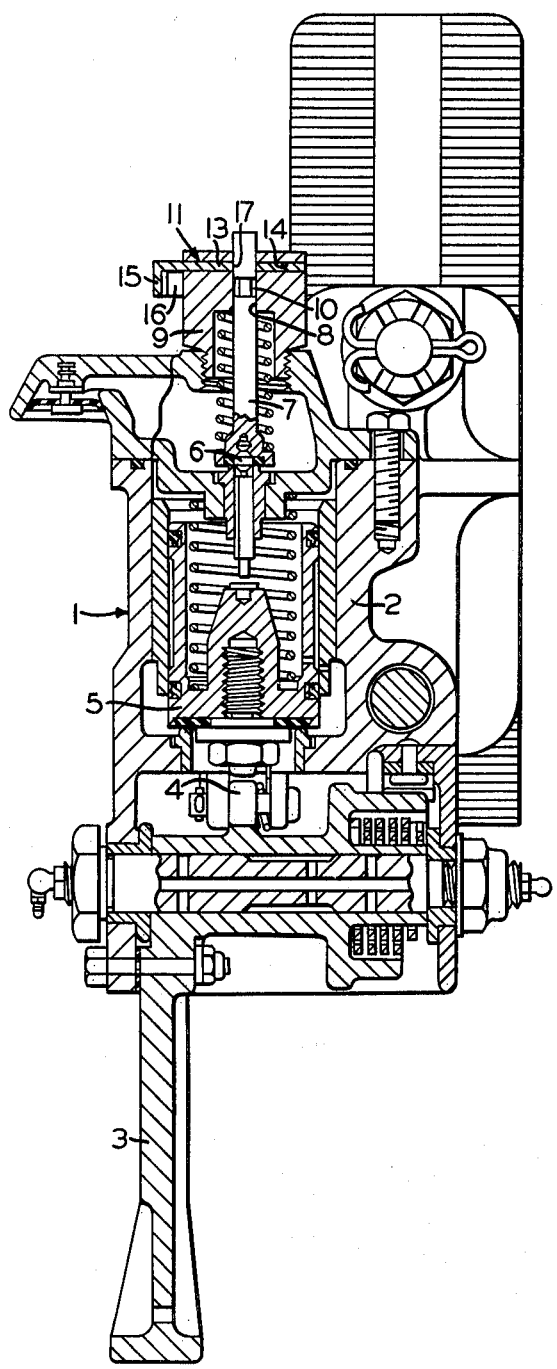
FIG. 1 is an elevational view, in section, of a trip cock device embodying the invention.

A trip cock device 1, shown in FIG. 1 and provided with the present invention, comprises a casing 2 by which the device is secured to a railway car (not shown) in such a location that a trip lever 3 may engage a trip arm (not shown) fixed on the track. Usually the trip arm on the track is located in an area presenting danger to a train entering such an area, so that, as will be explained hereinafter, an emergency brake application is effected to bring the train to a stop.

Since trip cock devices, per se, are well known, only a brief description of trip cock device 1, sufficient for understanding the invention, will be set forth.

When trip lever 3 is engaged by the trip arm on the track, said trip lever is rotated, along with a cam 4, to cause upward movement, as viewed in FIG. 1, of a piston 5, which in turn lifts pilot valve 6 into an unseated position to thereby cause brake pipe (not shown) pressure to be vented to atmosphere at an emergency rate for effecting, in a well-known manner, an emergency brake application.

When pilot valve 6 is lifted by piston 5, a stem 7 of said pilot valve is pushed upwardly through a bore 8 in cap nut 9 until an annular groove 10, formed in the stem adjacent the upper end thereof, is engaged by either a spring and bar arrangement 11 or a ball-type detent arrangement 12.

Figure 2:
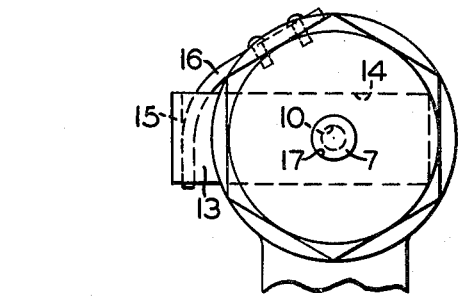
FIG. 2 is a fragmentary plane view, in outline, of the invention shown in FIG. 1.
Figure 3:
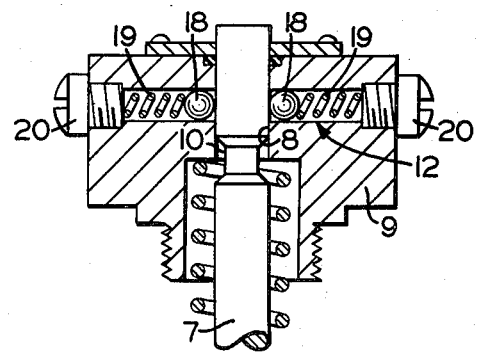
FIG. 3 is a fragmentary view, in section, of a modification of the invention.

The spring and bar arrangement 11 comprises a flat latch bar 13 transversely slidably disposed in a transverse slot 14 adjacent the top of cap nut 9. Latch bar 13 is provided with a right-angle tab 15 at one end against which a free end of a leaf spring 16, having its other end secured to cap nut 9 (see FIG. 2), applies a biasing force for causing sliding action of said latch bar in slot 14.

Pilot valve stem 7 passes through a hole 17 formed in latch bar 13, so that, when said valve stem is moved upwardly by piston 5 until groove 10 registers with said hole, spring 16 is effective for biasing the edge of said hole opposite tab 15 into said groove and latching the piston stem in its unseated position until manually released by pushing in on said tab until said hole is aligned with stem 7, which may then be pushed down to its seated position.

The ball arrangement 12 comprises a pair of oppositely-arranged detent balls 18 biased against valve stem 7 by respective springs 19 secured in place by screws 20. When valve stem 7 is moved upwardly, balls 17 engage groove 10 until manually released. Stem 7 is released by downward manual force applied to the upper end thereof.

Having now described the invention what we claim as new and desire to secure by Letters Patent, is:

1. A cap nut assembly for installation in a railway trip cock device, such trip cock device of the type having a trip lever engageable with a trip arm supported adjacent a railroad track section, such trip lever having a cam portion which causes upward movement of a piston as such trip lever is rotated, a pilot valve seat member disposed in such trip cock device above such piston and axially movable upward upon upward contact with such piston, said cap nut assembly comprising:

a cap nut member having a threaded portion adapted to insert into a threaded bore in such trip cock device axially above such pilot valve seat member; said cap nut member having a coaxial through bore;

a pilot valve stem member axially reciprocably movable in said through bore and having formed thereon an annular groove;

at least one detent member operably disposed in said cap nut member;

biasing means disposed in said cap nut member for biasing said detent member in a direction transversely to said through bore and engaging said groove; said stem having pilot valve means on the end opposite said groove and at a predetermined axial distance from said groove for engaging such pilot valve seat member in such trip cock device; and said predetermined axial distance being such that upward movement of said pilot valve means by said pilot valve seat member to an unseated position situates said detent member adjacent to said groove axially arresting said stem such that at least a portion of said stem extends axially outward of said through bore in said cap nut member to indicate a tripped condition of such trip cock device.

2. A cap nut assembly, as set forth in claim 1, wherein said detent member comprises a flat latch bar slidably disposed in a slot formed in said cap nut member transversely to said bore and having a hole therein through which said stem member may pass when aligned therewith, said latch bar having a right-angle tab formed on an outer end thereof, and a leaf spring secured at one end to the cap nut member with a free end thereof resting against said tab for exerting a biasing force on said latch bar in a direction for causing one side of said hole in said bar to engage said groove in said stem.

3. A cap nut assembly, as set forth in claim 1, wherein said detent member comprises a ball and a spring member acting thereagainst for biasing the ball against said stem member and into said groove when in a position registering therewith.

* * * * *